(12) United States Patent
Jang et al.

(10) Patent No.: US 9,465,528 B2
(45) Date of Patent: Oct. 11, 2016

(54) SYSTEM AND METHOD FOR MANAGING BOOK-RELATED ITEMS IN A MOBILE DEVICE

(71) Applicant: Samsung Electronics Co., Ltd., Gyeonggi-do (KR)

(72) Inventors: Sihak Jang, Gyeonggi-do (KR); Yuran Kim, Seoul (KR); Boran Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 97 days.

(21) Appl. No.: 13/681,655

(22) Filed: Nov. 20, 2012

(65) Prior Publication Data

US 2013/0132884 A1    May 23, 2013

(30) Foreign Application Priority Data

Nov. 22, 2011  (KR) .......................... 10-2011-0121996

(51) Int. Cl.
*G06F 3/048* (2013.01)
*G06F 3/0484* (2013.01)
*G06F 17/30* (2006.01)

(52) U.S. Cl.
CPC ..... *G06F 3/04842* (2013.01); *G06F 17/30058* (2013.01)

(58) Field of Classification Search
CPC .. G06F 3/1204; G06F 3/1285; G06F 17/211; G06F 17/24; G06F 3/1208; G06F 8/30; G06F 3/125; G06F 8/36; G06F 8/71; G06F 17/212; G06F 3/1264; G06F 3/1284; G06F 8/20; G06F 8/34; G06F 8/38
See application file for complete search history.

(56) References Cited

U.S. PATENT DOCUMENTS

| | | | | |
|---|---|---|---|---|
| 6,112,201 A | * | 8/2000 | Wical | G06F 17/30572 |
| 8,700,643 B1 | * | 4/2014 | Gossweiler, III | G06F 17/30038 707/754 |
| 2001/0007980 A1 | * | 7/2001 | Ishibashi et al. | 705/26 |
| 2003/0184600 A1 | * | 10/2003 | Lin-Hendel | 345/853 |
| 2004/0140975 A1 | * | 7/2004 | Saito | G07F 17/0014 345/418 |
| 2005/0033657 A1 | * | 2/2005 | Herrington et al. | 705/26 |
| 2005/0102610 A1 | * | 5/2005 | Jie | G06F 17/2247 715/206 |
| 2005/0283804 A1 | * | 12/2005 | Sakata et al. | 725/52 |
| 2006/0112335 A1 | * | 5/2006 | Hofmeister | G06F 3/0488 715/701 |
| 2008/0216009 A1 | * | 9/2008 | Drallos | G06F 3/04815 715/776 |
| 2009/0063299 A1 | * | 3/2009 | Amacker | 705/27 |
| 2010/0235406 A1 | * | 9/2010 | Williams | G06Q 10/06 707/803 |
| 2010/0315359 A1 | * | 12/2010 | Seong | G06F 15/025 345/173 |

(Continued)

FOREIGN PATENT DOCUMENTS

| | | |
|---|---|---|
| EP | 0821315 A1 | 1/1998 |
| WO | 2011/085386 A2 | 7/2011 |

*Primary Examiner* — William Bashore
*Assistant Examiner* — Rayeez Chowdhury
(74) *Attorney, Agent, or Firm* — Cha & Reiter, LLC (57) ABSTRACT

A system and method is provided that manages book-related items via bookshelves in an electronic device such as a mobile device with an e-book reader function. The method includes: displaying one or more bookshelves; selecting one of the bookshelves; and editing the selected bookshelf according to a user's input information related to edit, and displaying the user information.

20 Claims, 10 Drawing Sheets

(56) References Cited

U.S. PATENT DOCUMENTS

| | | | |
|---|---|---|---|
| 2011/0096014 A1* | 4/2011 | Fuyuno | G06F 1/1616 345/173 |
| 2011/0202624 A1* | 8/2011 | Najm | G06Q 30/02 709/207 |
| 2011/0264694 A1* | 10/2011 | Rensburg | G06F 17/241 707/770 |
| 2012/0089947 A1* | 4/2012 | Lee | G06F 3/0483 715/839 |
| 2012/0284276 A1* | 11/2012 | Fernando | G06F 17/3002 707/741 |
| 2013/0080471 A1* | 3/2013 | Forte | G06F 21/6218 707/785 |
| 2013/0239049 A1* | 9/2013 | Perrodin | G06F 3/0481 715/800 |

* cited by examiner

SYSTEM AND METHOD FOR MANAGING BOOK-RELATED ITEMS IN A MOBILE DEVICE

CLAIM OF PRIORITY

This application claims the benefit of priority under 35 U.S.C. §119(a) from a Korean patent application filed on Nov. 22, 2011 in the Korean Intellectual Property Office and assigned Serial No. 10-2011-0121996, the entire disclosure of which is hereby incorporated by reference in its entirety.

BACKGROUND OF THE INVENTION

1. Field of the Invention

The present invention relates to e-books and other types of electronic media. More particularly, the present invention relates to a system and method that classifies a number of e-books according to a user's preference, thereby systematically managing them.

2. Description of the Related Art

An electronic book (e-book) generally refers to a book-length publication in digital form, including text, images, etc. that can be used as a printed book. Users can easily purchase and read e-books via electronic devices, particularly mobile devices with an e-book reader function, such as a tablet PC, etc., anywhere and anytime they want. E-books are cheaper than printed books. This has led to a huge increase in the number of e-book.

A mobile device stores a number of e-books. A mobile device includes default folders that store e-books classified according to preset categories. When a mobile device downloads an e-book from a network, it detects the category information included in the added/identifying information of the downloaded e-book and stores the downloaded e-book in a corresponding folder. If the mobile device user wishes to read an e-book, he/she accesses a corresponding folder and selects a particular title. However, conventional mobile devices only allow the users to read e-books via the default folders, but are not equipped with a system and method that can efficiently manage e-books stored therein.

SUMMARY OF THE INVENTION

The present invention has been made in view of the above problems, and provides a system and method that allows users to efficiently manage a number of e-books in the mobile device unknown heretofore.

The invention further provides a system and method that allows users to easily manage e-books according to his/her preference.

In accordance with an exemplary embodiment of the invention, the invention provides a method for managing book-related items in a mobile device preferably including: displaying one or more bookshelves; selecting one of the bookshelves; and editing the selected bookshelf according to a user's input information related to edit, and displaying it.

In accordance with another exemplary embodiment of the invention, the invention provides a system for managing book-related items in a mobile device preferably including: a display unit for displaying one or more bookshelves; a storage unit for storing book-related items that can be added to the bookshelves; and a controller for selecting one of the bookshelves, editing the selected bookshelf according to a user's input information related to edit, and displaying the bookshelves.

BRIEF DESCRIPTION OF THE DRAWINGS

The features and advantages of the invention will become more apparent to a person of ordinary skill in the art from the following detailed description in conjunction with the accompanying drawings, in which:

FIGS. 4A to 4D illustrate screens to describe a method for editing personal bookshelves, according to an exemplary embodiment of the invention;

FIGS. 5A to 5F illustrate screens to describe a method for adding a folder to personal bookshelves, according to an exemplary embodiment of the invention;

DETAILED DESCRIPTION

Hereinafter, exemplary embodiments of the system and method for executing an e-book application, according to the present invention, are described in detail with reference to the accompanying drawings. The terms or words described in the present description and the claims should not be limited by a general or lexical meaning, instead should be analyzed as a meaning and a concept through which the inventor, being a person of ordinary skill in the art, defines and describes the invention at his most effort, to comply with the concept of the invention reduced to practice, as embodied by the appended claims. Therefore, one skilled in the art will understand that the exemplary embodiments disclosed in the description and configurations illustrated in the drawings are only preferred exemplary embodiments, instead there may be various modifications, alterations, and equivalents thereof to replace the embodiments at the time of filing this application. Although the drawings represent an exemplary embodiment of the invention, the drawings are not necessarily to scale and certain features may be exaggerated or omitted in order to better illustrate and explain the invention. Therefore, it should be understood that the invention is not limited to the exemplary embodiments.

In the following exemplary embodiments, e-books are classified according to categories, e.g., books, magazines, newspapers, comics, specialty publications, etc. It should be understood that each category may include sub-categories. For example, a book category may have, as sub-categories and/or classifications, novels, essays, magazines, poems, blog collections, notable news or political or sports columnists, etc., just to name a few possibilities.

In the following description, the term 'bookshelf' (or bookshelves) refers to a virtual area that can store book-related items. The bookshelf may be displayed in various shapes, e.g., a folder, a bookstand, or the like. The term 'book-related item' stored in a bookshelf refers to an e-book, a folder of holding a number of e-books, schedule for reading e-books, accessory for decorating a bookshelf, etc.

The book-related item managing system and method according to the present invention can be applied to a variety of electronic devices with e-book reader functions, e.g., mobile devices with touch screens, such as mobile phones, smart phones, tablet PCs, hand-held PCs, Portable Multimedia Players (PMPs), Personal Digital Assistants (PDAs), etc. The following exemplary embodiments will be described based on mobile devices to which the book-related item managing system and method is applied.

The book-related item managing system and method supports a function for editing bookshelves, i.e., allows users to make and/or edit bookshelves according to their preference, by adding or removing book-related items to or from the bookshelves. A detailed description of the bookshelf editing function will be provided in the following description. The features of the invention will be described in detail referring to the accompanying drawings. However, a detailed description of well-known functions and configurations incorporated herein may be omitted when their inclusion might obscure appreciation by a person of ordinary skill in the art of the subject matter of the present invention.

Figure 1:
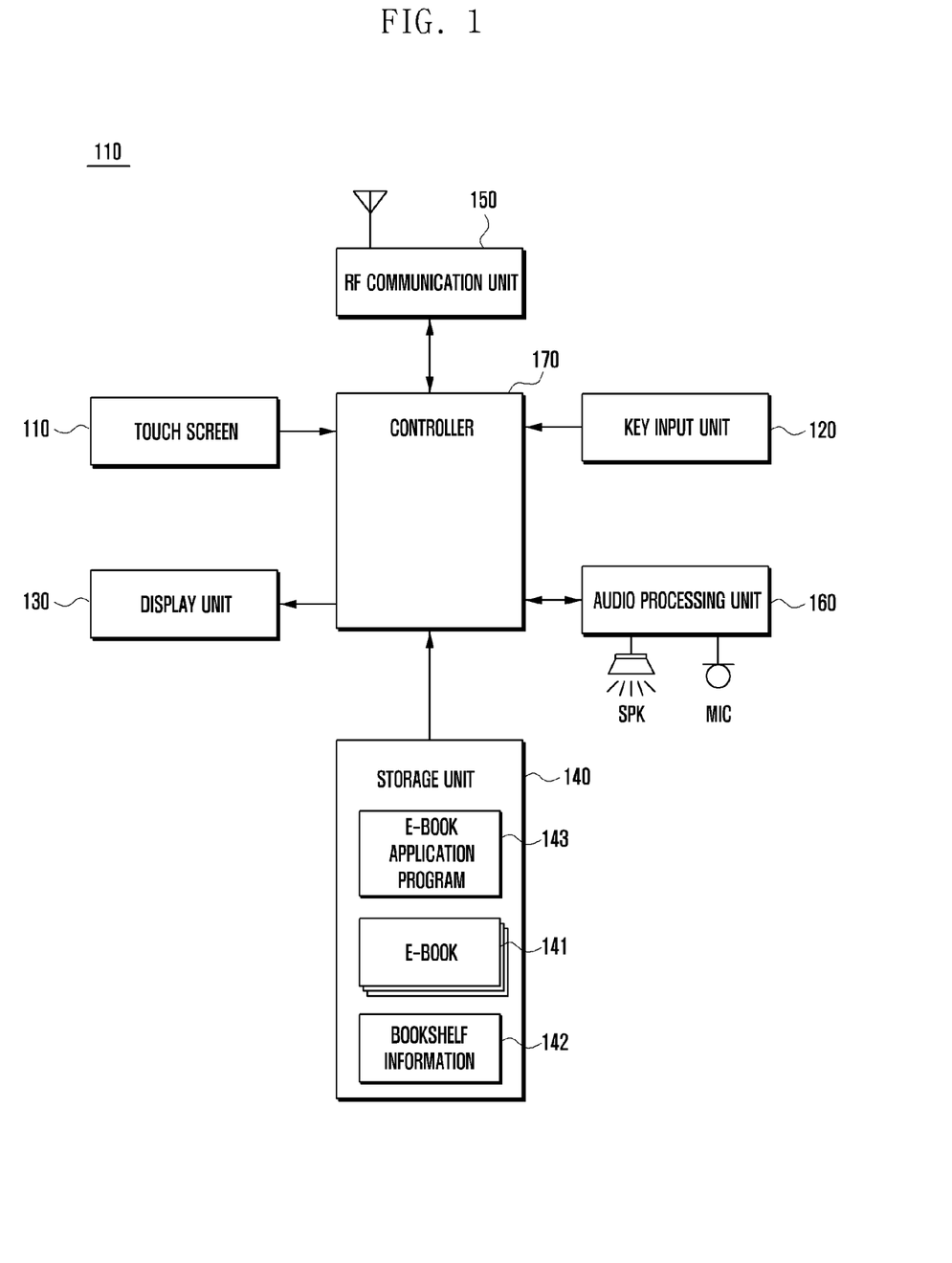
FIG. 1 illustrates a schematic block diagram of a mobile device according to an exemplary embodiment of the invention.

FIG. 1 illustrates a schematic block diagram of a mobile device according to an exemplary embodiment of the invention. The mobile device 100 preferably includes a touch screen 110, a key input unit 120, a display unit 130, a storage unit 140, an RF communication unit 150, an audio processing unit 160, a speaker (SPK), a microphone (MIC), and a controller 170.

The touch screen 110 is installed onto the display unit 130. The touch screen 110 senses a user's touch gestures, creates the events, and transfers the corresponding signals to the controller 170. The controller 170 identifies touch gestures according to the received signals, and performs corresponding control operations associated with the touch gestures and other types of touch. Examples of the touch gestures are touch, tap, double tap, press, drag, drag and drop, sweep, etc. 'Touch' refers to a gesture that presses at least one point on the touch screen. 'Tap' refers to a gesture that strikes gently on at least one point on the touch screen, i.e., a drop gesture. 'Double tap' refers to a gesture that briefly successively taps twice at least on one point on the touch screen. 'Press' refers to a gesture that contacts at least one point on the touch screen for longer than the 'tap' gesture and then releases it. 'Drag' refers to a gesture that touches at least one point on the touch screen and then moves to another location without removing the touch. 'Drag' is also called 'scroll.' 'Drag and drop' refers to a gesture that selects a virtual object by grabbing the virtual object and dragging it to a different location or onto another virtual object. 'Sweep' refers to a gesture that brushes lightly on the touch panel with the user's finger or an object. 'Sweep' is also called 'flick.' The controller 170 can distinguish 'drag' and 'sweep' via the speed of moving a corresponding object on the touch screen 110. The touch screen 110 may be implemented with various types of sensors, such as a resistive type, a capacitive type, an electromagnetic induction type, a pressure type, etc. Other types of thin-film technology may also be used.

The key input unit 120 includes a number of input keys and function keys that receive numbers and letters and set a variety of functions in the mobile device 100. The function keys include direction keys, side keys, shortcut keys, etc., which are set to perform specific functions. The key input unit 120 creates key signals, related to a user's settings and function controls of the mobile device 100, and transfers them to the controller 170. Examples of the key signals are turning on/off the mobile device 100, adjusting the volume, turning on/off the screen, etc. The controller 170, which comprises such hardware as microprocessor or processor (the microprocessor or processor comprise hardware and the claims are to be interpreted as such, controls corresponding components according to the key signals. The key input unit 120 may be implemented with a QWERTY keypad, a 3×4 keypad, a 4×3 keypad, a Dvorak keypad, etc., which includes a number of keys. When the mobile device 100 is designed to include a full touch screen, the key input unit 120 may be implemented as side keys for turning on/off the screen or the mobile device 100, which are installed to the side of the case of the mobile device 100.

With continued reference to FIG. 1, the display unit 130 converts video data from the controller 170 into analog signals, and displays them. The display unit 130 displays a variety of screens sequentially or simultaneously according to the control of the controller 170, e.g., a lock screen, a home screen, an application execution screen, a menu screen, a message writing screen, an Internet screen, a keypad screen, etc., just to name a few possibilities. The display unit 130 also displays an e-book application execution screen under the control of the controller 170. The lock screen refers to a screen displayed when the display unit 130 is turned on. When a touch event for unlocking the locked mobile device occurs, the controller 170 unlocks the mobile device 100 and switches the lock screen to a home screen or an application execution screen. The home screen refers to a screen showing a number of icons corresponding to respective applications. If the user selects one of the icons, the controller 170 executes the application and displays the application execution screen on the display unit 130.

The display unit 130 displays a bookshelf screen and a bookshelf edit screen under the control of the controller 170. The bookshelf screen and the bookshelf edit screen may comprise, for example, screens that are displayed when the e-book application is executed. The bookshelf screen includes a default bookshelf screen and a personal bookshelf screen, which are preferably switched back and forth from each other via a touch gesture. For example, while displaying one of the default bookshelf screen and personal bookshelf screen, when the controller 170 detects a scrolling gesture in the right or left direction, it controls the display unit 130 to display the other bookshelf screen. The default bookshelf screen may be defined as a screen showing default bookshelves having preset (pre-defined) categories. In other words, a number of e-books in the mobile device 100 are classified according to preset categories and stored in the corresponding default bookshelves. The default bookshelf screen shows a book shelf storing, for example, one or more of poems, novels, dramas, essays, etc., a newspaper bookshelf storing newspapers, etc., a magazine bookshelf storing magazines, etc., a specialty publication bookshelf storing specialty publications, and a comic bookshelf storing comic books, etc. When the mobile device 100 downloads an e-book via a network (or receives the e-book via a peer-to-peer transmission), it is automatically classified according to a corresponding category and stored in the corresponding default bookshelf. The personal bookshelf screen may be defined as a screen showing one or more personal bookshelves. The bookshelf edit screen may be defined as a screen to edit the personal bookshelves. That is, the user can record e-books in the personal bookshelves irrespective of their categories via the bookshelf edit screen. Although an e-book is recorded in a personal bookshelf, it would not be removed from the default bookshelf where it was classified and stored according to a corresponding category. That is, the personal bookshelves are managed irrespective of the default bookshelves. If an e-book is removed from a default bookshelf, it is also deleted in the storage unit 140. On the contrary, when an e-book is removed from a personal bookshelf, it is not deleted in the storage unit 140. The reason for non-deletion is because e-books stored in the personal bookshelves refer to shortcuts to ebooks, not the real e-books. Since shortcuts, in general, refer to programming links or pointers including but not limited to shortcut icons corresponding to real objects in the mobile device, although an e-book in a personal bookshelf, i.e., a shortcut, is removed, the real e-book content is not deleted in the mobile device 100. Meanwhile, the personal bookshelf may be fixed in location on the personal bookshelf screen. The personal bookshelf may also have a fixed number of items to be recorded. Each personal bookshelf is shaped preferably with a shelf, or series of shelves or a partition, which will be described later referring to the accompanying drawings. The user can create, move, or remove a personal bookshelf.

The display unit 130 may simultaneously display a number of screens under the control of the controller 170. For example, the display unit 130 may display two display areas, one display area showing a keypad and the other display area showing a bookshelf edit screen. During this process, the controller 170 can control the display unit 130 to display one of the screens as a main screen and other as a sub-screen, superimposed on the main screen. For example, the display unit 130 may display a bookshelf screen and have a keypad screen superimposed thereon. The display unit 130 may be implemented with a flat display panel, such as a Liquid Crystal Display (LCD), an Organic Light Emitting Diode (OLED), an Active Matrix Organic Light Emitting Diodes (AMOLED), or the like, just to name a few possibilities. Virtually any thin film technology screen can be used.

The storage unit 140, which comprises a non-transitory machine readable medium, preferably stores an operating system (OS) for booting the mobile device 100, application programs executed by a hardware processor or microprocessor of the controller 170 to operate the functions related to the invention, and data generated when the mobile device 100 is operated. The storage unit 140 preferably includes both a program storage area and a data storage area, with further subdivision being possible.

The data storage area stores data created when the mobile device 100 is operated under control of the controller 170. The data storage area also stores data downloaded from external systems, e.g., e-books, contacts, images, documents, videos, messages, emails, audio files, etc. The data storage area also stores screens to be displayed on the display unit 130, e.g., keypad screens, menu screens, etc. Examples of the keypad screens may be a 3×4 keypad, a QWERTY keypad, a DVORAK keypad etc, just to name a few of many possibilities. Examples of the menu screens may include a key (real or virtual) for switching screens (e.g., a return key for returning back a current screen to the previous screen, etc.), a key (real or virtual) for controlling applications that are currently executed, etc. The data storage area may serve as a buffer, or there can be a separate buffer, that temporarily stores data according to a copy and paste command, such as messages, images or photographs, web pages, document, etc. The data storage area stores the setting values for the functions of the mobile device 100, e.g., a screen brightness value, a setting whether vibration is created according to touches, an automatic screen rotation function, etc.

The data storage area stores a number of e-books 141, which as previously disclosed, generally refers to a wide variety of items including, for example, electronic magazines, newspapers, periodicals. The data storage area also stores information 142 regarding a number of bookshelves. In other words, the bookshelf information 142 includes information regarding a number of e-books and information regarding at least one personal bookshelf. The bookshelf information 142 includes a title of an e-book, the total number of pages, information regarding whether a reading schedule is set, etc. The bookshelf information 142 further includes accessory information, reading state information, a reading schedule, etc.

With continued reference to FIG. 1, the data storage area stores the reading state information regarding the respective e-books 141. The reading state information preferably includes one or more of a user's read page number, read date, the remaining number of pages, a user's input information, etc. The user's input information is defined as information that the user additionally input to a page. The user's input information may be displayed on a page when it is open. Examples of the user's input information are a note, a highlight, an image, a bookmark, etc.

The data storage area also stores a reading schedule of e-books. The reading schedule includes a date that an e-book starts to be read, a date that an e-book has been read, alarm information, an amount of e-books to be read by dates (a reading range), the success rate, etc. The success rate can be calculated via the ratio of an amount of pages that have been actually read to an amount of pages yet to be read, or scheduled but unread. For example, if a user schedules to read 100 pages of an e-book for one day but has read 80 pages, the success rate is 80%. The success rate may include a success rate by dates and an average success rate. The average success rate is a ratio of an amount of pages of an e-book that have been read to the total number of pages of the e-book.

The program storage area stores, inter alia, an operating system (OS) for booting the mobile device 100 and controlling the entire operation of the components in the mobile device 100. The program storage area also stores application programs for optional functions, e.g., a web browser function, an audio file playback function such as MP3 files, a camera function, etc. The program storage area stores an e-book application 143 with a function of editing personal bookshelves. Again, while a mobile communication device is preferred, the present invention is applicable to all sorts of applicable devices.

The RF communication unit 150 establishes communication channels for a voice/video call, or data communication such as video or messages, with other communication systems, under the control of the controller 170. To this end, the RF communication unit 150 includes an RF transmitter for up-converting the frequency of signals to be transmitted and amplifying the signals and an RF receiver for low-noise amplifying received RF signals and down-converting the frequency of the received RF signals. The RF communication unit 150 includes a mobile communication module (e.g., a 3-Generation (3G) mobile communication module, 3.5G, 4G, LTE, and etc.), a short-range communication module (e.g., Wi-Fi module), a digital broadcasting module (e.g., a DMB module), etc. It should be noted the presently claimed invention is applicable to other types of communication modules to be developed in the future.

With continued reference to FIG. 1, the audio processing unit 160 transfers audio signals, output from the controller 190, to a speaker (SPK) or an interface in which an earjack or headset can be connected. The audio processing unit 160 also transfers audio signals such as voices, input via a microphone (MIC), to the controller 170. The audio processing unit 160 converts voice/audio data into audible signals and then outputs them via a speaker, according to the control of the controller 170. The audio processing unit 160 also converts audio signals such as voices, received via a microphone, into digital input signals and then transfers them to the controller 170.

The controller 170, which comprises hardware such as a processor or microprocessor controls the entire operation of the mobile device 100 and the signals flowing among the components therein. The controller 170 processes data and executes applications. The controller 170 also controls the electric power supplied to the components from the battery. The controller 170 executes the application programs stored in the program storage area. In particular, the controller 170 includes an e-book application executing unit as shown in FIG. 2.

Figure 2:
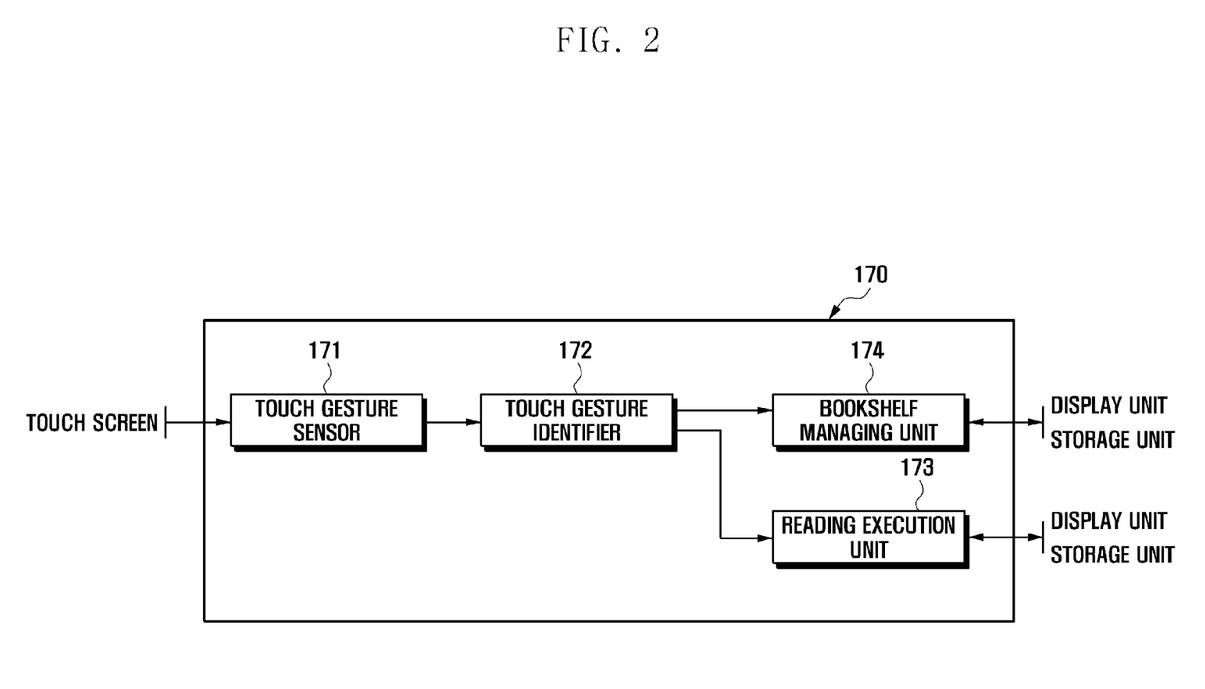
FIG. 2 illustrates a detailed view of an e-book application executing unit in the controller shown in FIG. 1.

FIG. 2 illustrates a detailed view of an e-book application executing unit in the controller shown in FIG. 1. The e-book application executing unit may be installed integrally or separately from the controller 170. In the following description, it is assumed that the e-book application executing unit is installed within the controller 170.

Referring now to FIG. 2, the e-book application executing unit preferably includes a touch gesture sensor 171, a touch gesture identifier 172, a reading execution unit 173, and a bookshelf managing unit 174.

The touch gesture sensor 171 is connected to the touch screen 110 and senses touch gestures thereon. The touch gesture sensor 171 senses coordinates of touches, types of touch gestures, and touched directions, etc. Finger touch or a stylus can be used for the touch gestures.

The touch gesture identifier 172 identifies different types of sensed touches. Examples of some of the types of sensed touches are a touch for executing a reading operation and a touch for managing bookshelves. The touch gesture identifier 172 identifies a reading execution touch and transfers the information to the reading execution unit 173. Likewise, the touch gesture identifier 172 identifies a bookshelf managing touch and transfers the information to the bookshelf managing unit 174.

With continued reference to FIG. 2, the reading execution unit 173 executes a reading function of an e-book according to the information regarding the reading function execution touch transferred from the touch gesture identifier 172. The reading execution unit 173 preferably loads a corresponding e-book from the storage unit 140 and displays a corresponding page on the display unit 130. If the sensed touch corresponds to a touch for turning over pages (advancing the pages displayed), the reading execution unit 173 turns over pages of the e-book. The appearance of the page physically turning over is preferable to provide a reader with a sense they are reading something that still looks in some ways like a paper book, or the pages may just advance in display without showing a turning over of the pages. The reading execution unit 173 turns over a current page to the next page and displays it on the display unit 130. During this process, the reading execution unit 173 determines whether or not the turning-over operation is an operation to turn over a page after it has been read. If the reading execution unit 173 ascertains that the turning-over operation comprises an operation to turn over a page after it has been read, the reading execution unit sets the turned-over page as a read page and stores the information in the storage unit 140. When the reading execution unit 173 ascertains that pages of an e-book are turned over by a unit of page, it detects that the current page is read and updates the reading state information regarding to the e-book by reflecting the information where the current page was read. When a flick gesture is performed on the pages of an e-book displayed on the display unit 130 in the right or left direction, the reading execution unit 173 concludes that the current page is read and controls the display unit 130 to display the next or previous page. On the contrary, when a page of an e-book is jumped to a specific page other than the previous or next page, the reading execution unit 173 may conclude that the page is not read. It should be understood that the condition for determining whether a page has been read may also be set via a user's input information, such as a period of time, etc. For example, it is assumed that the condition is set via a user's input information. If a user inputs information to a current page of an e-book and turns (or advances) to the page of table of contents or a specific page, the controller 170 concludes that the current page is read. When the controller 170 ascertains that a user's input information is inserted to a current page, although the following turning-over operation is performed to any page, the controller concludes that the current page is read. In addition, it is assumed that the condition for determining whether a page has been read is set via a period of time. If the controller 170 detects that a current page of an e-book is displayed over a preset period of time, the controller 170 concludes that the current page is read. As described above, the condition for determining whether a page has been read may be set via a determination as to whether a user inputs information to a current page, and a determination as to whether a current page is displayed over a preset period of time as well as a determination as to whether a current page is turned over. It is also within the spirit and scope of the present invention that a "read" button or prompt can be touch to indicate that the current page has been read.

The bookshelf managing unit 174 manages bookshelves in the mobile device 100 according to the information regarding the bookshelf managing touch transferred from the touch gesture identifier 172. If a touch event for editing personal bookshelves occurs, the bookshelf managing unit 174 controls the display unit 130 to display a bookshelf edit screen. The bookshelf edit screen preferably includes one or more personal bookshelves, an item deletion button, an item addition button, etc. When the user operates the item deletion button, the bookshelf managing unit 174 removes the corresponding item from display on the personal bookshelf. Likewise, when the user operates the item addition button, the bookshelf managing unit 174 controls the display unit 130 to display a screen showing types of items so that the user can select a corresponding item to be added to the display of a personal bookshelf. The screen showing types of items may preferably include an e-book selection menu, a folder selection menu, an accessory selection menu, a reading schedule selection menu, etc. If the user operates the e-book selection menu, the bookshelf managing unit 174 controls the display unit 130 to display a screen for showing e-books stored in the mobile device 100 so that the user can select a corresponding e-book and add it in a personal bookshelf. If the user operates the folder selection menu, the bookshelf managing unit 174 controls the display unit 130 to display a screen that allows the user to hold/stack one or more e-books in a folder and to add it to a personal bookshelf. If the user operates the accessory selection menu, the bookshelf managing unit 174 controls the display unit 130 to display a screen showing accessory images so that the user can select a corresponding accessory image and add it in a personal bookshelf. If the user operates the reading schedule selection menu, the bookshelf managing unit 174 controls the display unit 130 to display a screen so that the user can select one of e-books with reading schedules and add the reading schedule of the selected e-book in a personal bookshelf. The bookshelf managing unit 174 stores the information regarding bookshelves, set via the additional screens, and the bookshelf screens cooperating with the information, in the storage unit 140. An artisan should understand and appreciate that each of the items shown in FIG. 2 include hardware such as a processor or microprocessor, and it is within the spirit and scope of the claimed invention that a single processor or microprocessor comprised of hardware can be configured to perform all the functions, or there can be more than one processor or microprocessor.

Although it is not shown in the drawings, the mobile device 100 may selectively further include various types of hardware components, for example: a camera module, a GPS module, a sensor module for sensing the states and locations of the mobile device 100, an interface module for connecting to external devices in a wireless or wired mode, etc. With the spread of digital convergence, although it is impossible to list all the modifications of mobile devices in this description, it will be easily appreciated by those skilled in the art will understand and appreciate that the other components equivalent to the above-listed components may be further included to the mobile device according to the invention. Also, the artisan will appreciate that, according to the purposes used, the mobile device may be implemented by omitting a particular component or replacing it with other components.

Figure 3:
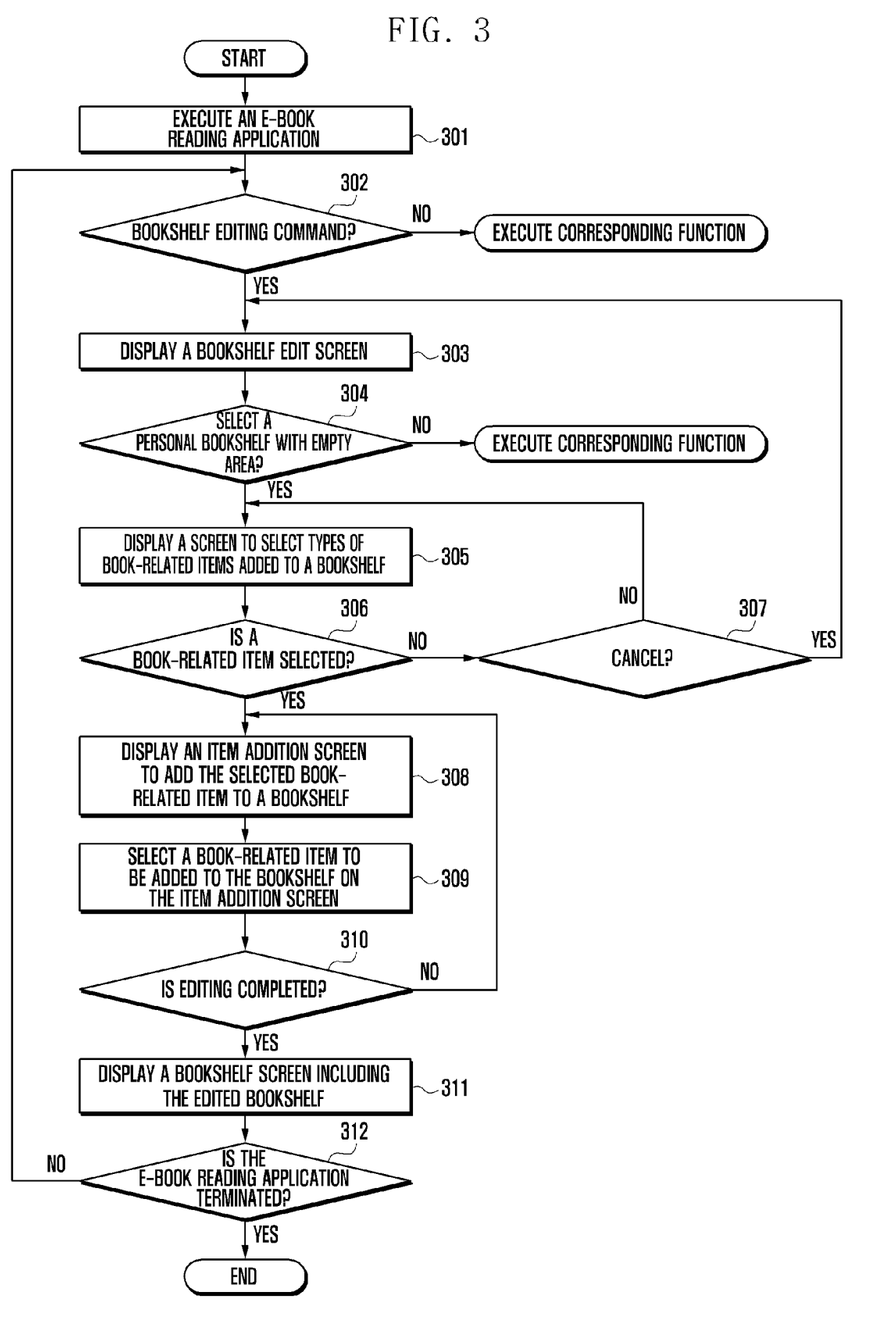
FIG. 3 illustrates a flow chart that describes a method for managing book-related items in a mobile device, according to an exemplary embodiment of the invention.

FIG. 3 illustrates a flow chart that illustrates exemplary operation of a method for managing book-related items in a mobile device, according to an exemplary embodiment of the invention.

Referring now to FIGS. 1 to 3, when the mobile device 100 operates in an idle state, the device 100 may display a home screen showing an icon for executing an e-book application program. At step (301), if the user touches the icon of an e-book application 143 on the home screen, the controller 170 executes the e-book application 143 and controls the display unit 130 to display a bookshelf screen, i.e., a personal bookshelf screen. When a user's touch event occurs on the personal bookshelf screen on the touch screen 110, the signal is transferred to the controller 170 so that the controller detects a user's touch gesture.

At step (302), the controller 170 determines whether the user's input touch comprises a touch for editing bookshelves on the personal bookshelf screen. If the controller 170 ascertains that the user's input touch is a touch for editing bookshelves at step (302), then at (303) controls the display unit 130 to display a bookshelf edit screen. On the contrary, if the controller 170 ascertains that the user's input touch is a touch other than the touch for editing bookshelves, e.g., a touch for executing a reading function, at step (302), the controller executes the reading function.

When displaying a bookshelf edit screen at step (303), the controller 170 determines at (304) whether the user applies a touch gesture to a personal bookshelf with empty area on the touch screen 110. The empty area in a personal bookshelf refers to a region to which items can be added to the items displayed on the bookshelf. During this process, the controller 170 controls the display unit 130 to display an addition button in the empty area in order to inform the user that items can be added for display in the personal bookshelf.

If the user selects the addition button at step (304), then at (305) the controller 170 controls the display unit 130 to display a screen showing types of items. On the contrary, if the controller 170 ascertains that a user's input touch is not a touch for adding an item for display but a touch for deleting an item at step (304), the controller removes an item from display on a corresponding personal bookshelf.

With continued reference to FIG. 3, when displaying a screen for selecting one of the types of items at (step 305), the controller 170 then determines at (306) whether the user inputs a touch for selecting one of the items on the screen. If the controller 170 ascertains that the user inputs a touch other than a touch for selecting one of the items at step (306), then a (307) the controller 170 determines whether the detected touch is the cancel button on the item selection screen.

In an exemplary embodiment of the present invention, the item selection screen may include an e-book selection menu, a folder selection menu, an accessory selection menu, and a reading schedule selection menu as well as the cancel button, just to name some of the items. If the controller 170 ascertains at (307) that the detected touch is the cancel button on the item selection screen, the controller proceeds with step (303). On the contrary, if the controller 170 ascertains at (307) that the detected touch is not the cancel button, then the controller 170 proceeds with step (305).

Meanwhile, if the controller 170 ascertains at (306) that the user inputs a touch for selecting one of the items on the item selection screen, then at (308) the controller displays an addition screen for adding the selected item to a bookshelf. The additional screen may be one of the folder addition screen, e-book addition screen, accessory addition screen, and reading schedule addition screen, which is selected by the user. While displaying the addition screen at step (308), the controller 170 then at (309) selects an item to be added to the personal bookshelf, according to the user's input information, i.e., a touch gesture. After that, the controller 170 determines at (310) whether or not the personal bookshelf editing operation (i.e., an item addition). If the controller 170 ascertains at (310) that the personal bookshelf editing operation has not been completed, the controller proceeds back to step (308). On the contrary, if the controller 170 ascertains at (310) that the personal bookshelf editing operation has been completed, the controller 170 at (311) then controls display of the bookshelf screen including the edited personal bookshelf. After that, the controller 170 at (312) determines whether or not a command for terminating the e-book application 143 is input. If the controller 170 ascertains at (312) that a command for terminating the e-book application 143 was not input, the controller 170 proceeds back to step (302).

In the following description, a book-related item managing system and method is explained in detail referring to the accompanying drawings.

Figure 4:
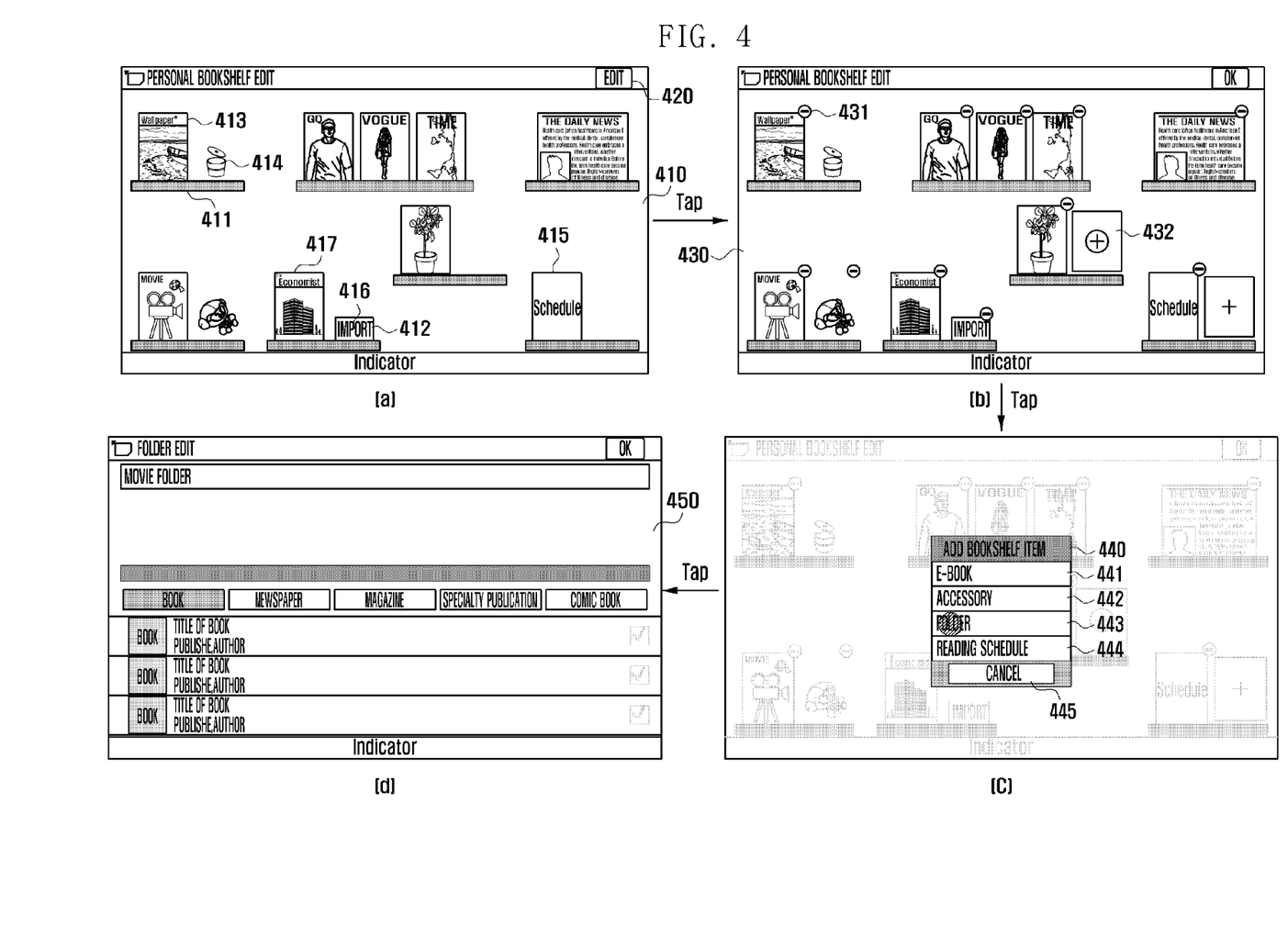

FIGS. 4A to 4D illustrate screens to describe a method for editing personal bookshelves, according to another exemplary embodiment of the invention. As shown in FIG. 4A, the controller 170 controls the display unit 130 to display a bookshelf screen 410. The bookshelf screen 410 shows a plurality of personal bookshelf images, or personal bookshelves. In an exemplary embodiment of the invention, each personal bookshelf image is shaped as a shelf image 411. The personal bookshelf image may include at least one of a folder image 412, an e-book information image 413, an accessory image 414, and a reading schedule image 415. The e-book information image 413 corresponds to information regarding an e-book stored in a default bookshelf. The e-book information image 413 may be a shortcut icon to a corresponding e-book. The shortcut icon may be implemented with a representative image of a corresponding e-book, e.g., the cover. The controller 170 controls the display unit 130 to display a user's set folder name 416 in the folder image 412. The folder image 412 may also be displayed with an image 417 of information regarding a representative one of the e-books in the folder of the folder image 412, i.e., a shortcut icon. An artisan understands and appreciates that the folder image shown is merely exemplary, adm the appended claims are not limited to such an image. The representative e-book may be a user's recently read e-book. It should be understood that the personal bookshelf image is not limited to the shape of the shelf image 411. For example, it may be shaped as a bookshelf image with a number of partitions.

If the controller 170 detects a tap applied to an edit button 420 on the bookshelf screen 410 as shown in FIG. 4A, the controller controls the display unit 130 to display a bookshelf edit screen 430 as shown in FIG. 4B. An artisan understands the presently claimed invention is not limited to the size, position or look of the edit button shown in FIG. 4A. The bookshelf edit screen 430 shows a number of personal bookshelf images, or personal bookshelves, deletion buttons 431 for items in the personal bookshelves respectively, and addition buttons 432 in empty areas in the personal bookshelves respectively. The empty areas do not have items therein. If the controller 170 detects a tap applied to a deletion button 431, it removes the corresponding item in the personal bookshelf, and accordingly shows an addition button the empty area, in order to signify there is available empty space to place an e-book link/icon, etc.

On the contrary, with reference to FIG. 4B, if the controller 170 detects a tap applied to an addition button 432 on the bookshelf edit screen 430, the controller 170 controls the display unit 130 to display an item selection screen 440 superimposed on the bookshelf edit screen 430 as shown in FIG. 4C. The item selection screen 440 includes an e-book selection menu 441, an accessory selection menu 442, a folder selection menu 443, a reading schedule selection menu 444 and a cancel button 445. If the controller 170 detects a tap applied to one of the menus, e.g., the folder selection menu 443, the controller 170 controls the display unit 130 to display a folder addition screen 450 as shown in FIG. 4D.

Figure 5A:
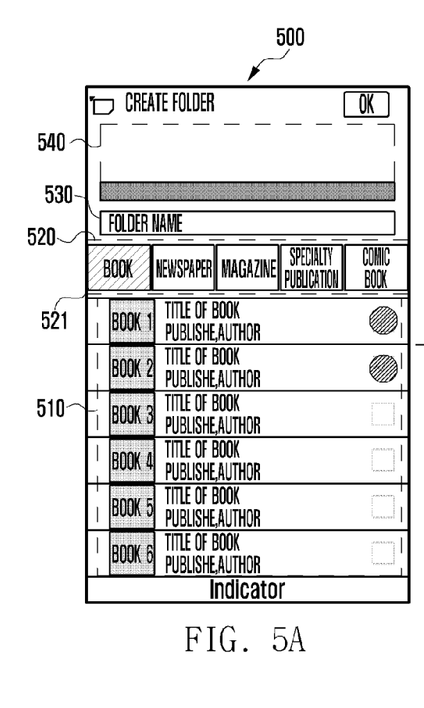

FIGS. 5A to 5F illustrate screens to describe a method for adding a folder to personal bookshelves, according to another exemplary embodiment of the invention. As shown in FIG. 5A, the controller 170 controls the display unit 130 to display a folder addition screen 500. The folder addition screen 500 preferably includes an e-book display area 510, a category display area 520, a folder name input field 530, and a folder creating area 540. The e-book display area 510 may be defined as an area for showing information regarding e-books stored in the mobile device 100, e.g., title of e-books, publishers, publication dates, etc. The category display area 520 may be defined as an area for showing categories of e-books. The folder name input field 530 may be defined as an area for showing a folder name input by the user. The folder creating area 540 may be defined as an area for showing information regarding e-books to be added to personal bookshelves, i.e., shortcuts. If the controller 170 detects a tap applied to one of the categories in the category display area 520, e.g., a book category 521, the controller 170 then controls the display unit 130 to display a list of e-books corresponding to the book category 521 on the e-book display area 510. The e-books are also displayed on the e-book display area 510, with corresponding checks boxes, together.

Figure 5B:
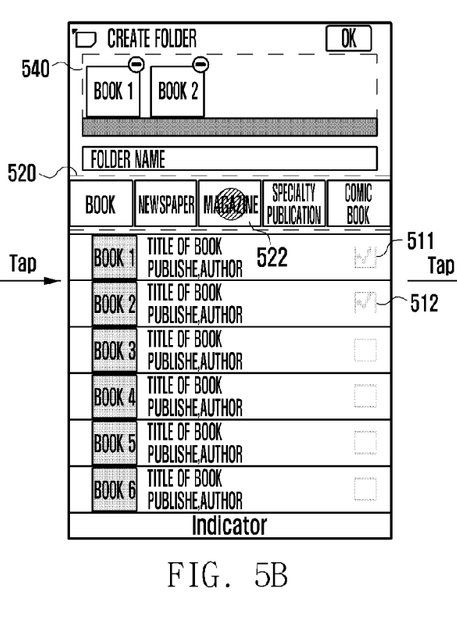

For example, if the user taps corresponding check boxes on the screen as shown in FIG. 5A, the controller 170 controls the display unit 130 to display check marks on the boxes 511 and 512 and adds the information regarding the corresponding e-books to the folder creating area 540 as shown in FIG. 5B.

Figure 5C:
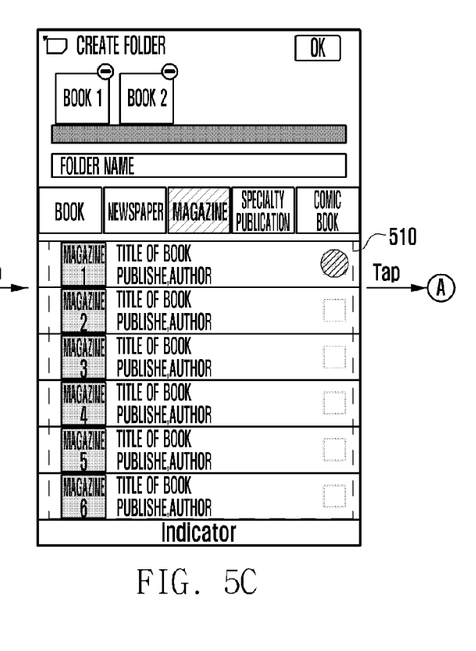

Moreover, if the user taps a magazine category 522 in the category display area 520 on the screen as shown in FIG. 5B, the controller 170 controls the display unit 130 to display a list of e-books, i.e., electronic magazines (e-magazines), together with corresponding check boxes, on the e-book display area 510 as shown in FIG. 5C.

Figure 5D:
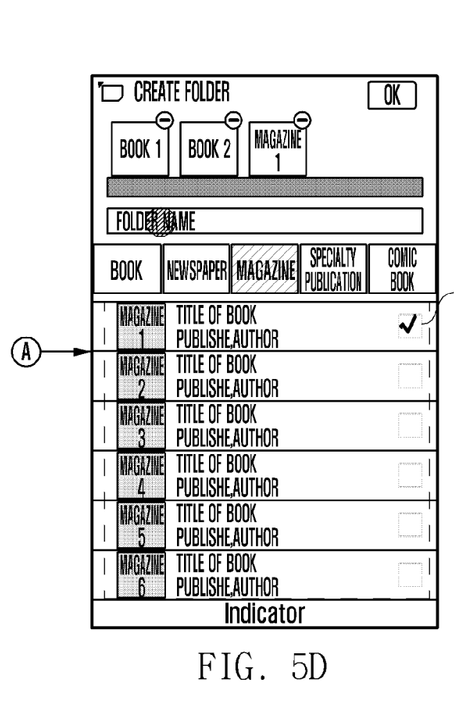
Figure 5E:
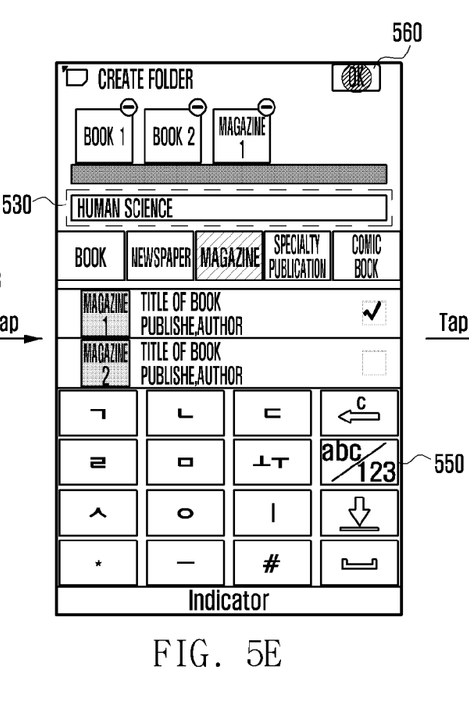
Figure 5F:
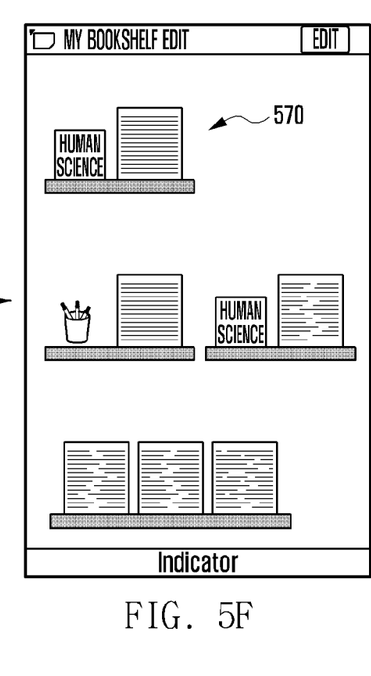

As shown in FIG. 5C, if the user taps a check box on the screen 510, the controller 170 controls the display unit 130 to display a check mark on the tapped check box 513 (shown in FIG. 5D) and adds information regarding the corresponding e-book to the folder creating area 540 in FIG. 5D. If the user taps the folder name input field 530 on the screen 510 as shown in FIG. 5D, the controller 170 controls the display unit 130 to display a keypad 550 on the screen as shown in FIG. 5E. If the user inputs a folder name via the keypad 550, the controller 170 displays it on the folder name input field 530 as shown in FIG. 5E. If the user taps the Ok button 560 in order to finish the personal bookshelf editing operation as shown in FIG. 5E, the controller 170 stores the information regarding the edited personal bookshelf in the storage unit 140, and controls the display unit 130 to display the bookshelf screen including the edited personal bookshelf 570 as shown in FIG. 5F.

Figure 6:
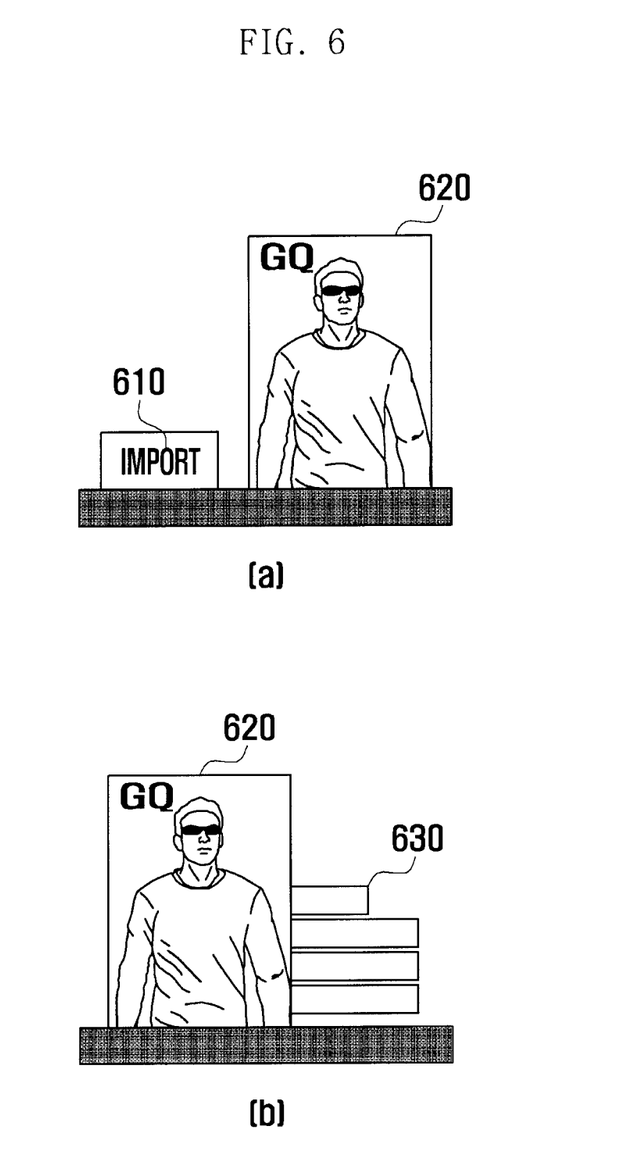
FIGS. 6A and 6B illustrate screens showing a folder with a personal bookshelf, according to an exemplary embodiment of the invention.

FIGS. 6A and 6B illustrate exemplary screens showing a folder with a personal bookshelf, according to an exemplary embodiment of the invention. As shown in FIG. 6A, a folder, or a folder image, is designed to include a folder name 610 of a folder and an e-book information image 620 regarding a representative e-book in the folder. If the user touches the folder image, the controller 170 opens the corresponding folder and controls the display unit 130 to display the information regarding e-books in the folder. If the user touches the e-book information image 620, the controller 170 opens the corresponding e-book.

Alternatively, as shown in the example of FIG. 6B, a folder, of a folder image, may also be designed to include a book image 630 shaped as a number of e-books in a bookshelf and an e-book information image 620 regarding a representative e-book in a folder. If the user touches the book image 630, the controller 170 controls the display unit 130 to display information regarding e-books in the folder. In an embodiment of the invention, the book image 630 is shaped as a stack of books. Alternatively, a folder, or a folder image, may also be designed to include a book image described above, and the name.

Figure 7:
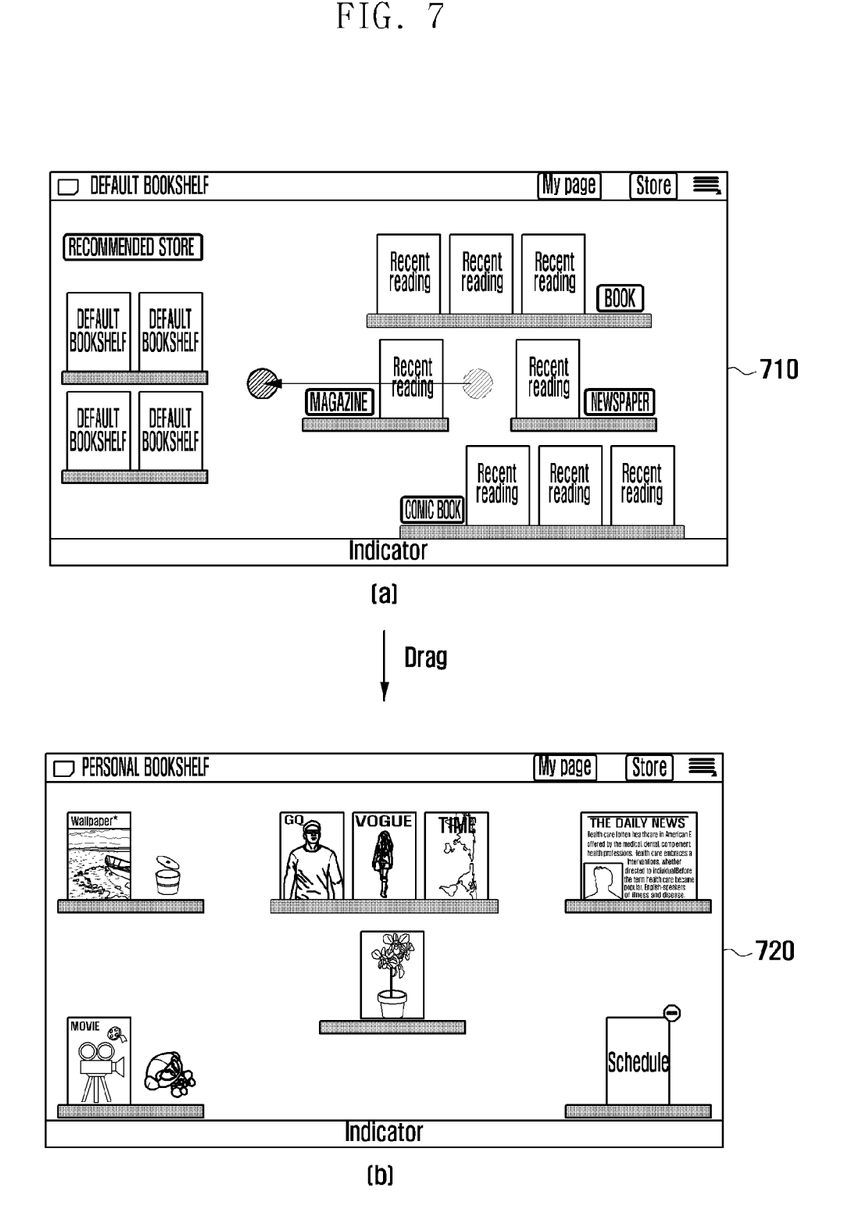
FIGS. 7A and 7B illustrate bookshelf screens according to an exemplary embodiment of the invention.

FIG. 7A shows a default bookshelf screen 710 and FIG. 7B shows a personal bookshelf screen 720. The display of either the default bookshelf screen 710 or the personal bookshelf screen 720 may be switched from one bookshelf to the other according to a user's input touch. For example, if the controller detects a drag gesture from right to left on the on the default bookshelf screen 710, it controls the display unit 130 to display a personal bookshelf screen 720; and vice versa.

Figure 8A:
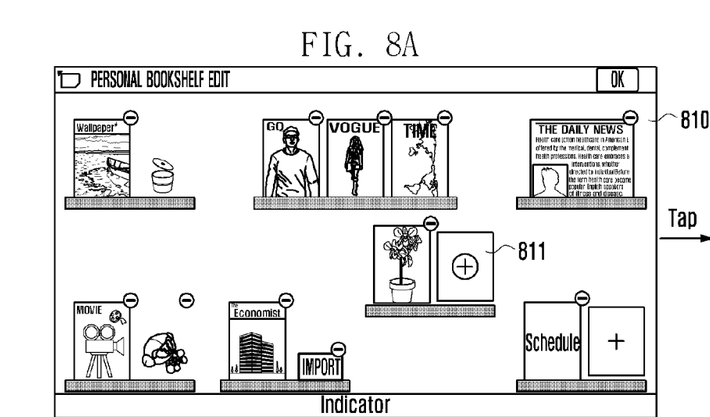
FIGS. 8A and 8E illustrate screens to describe a method for adding an e-book in a personal bookshelf, according to an exemplary embodiment of the invention.
Figure 8B:
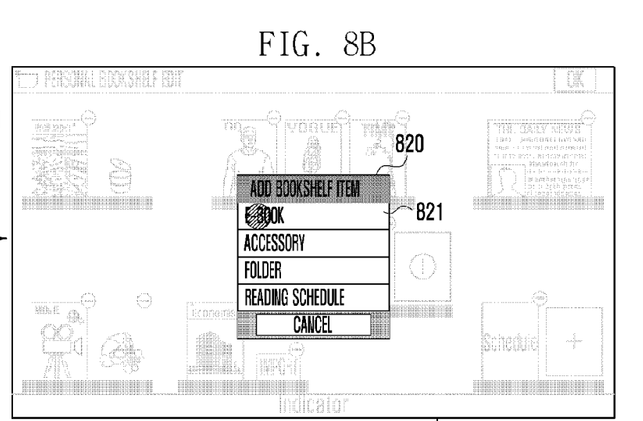
Figure 8C:
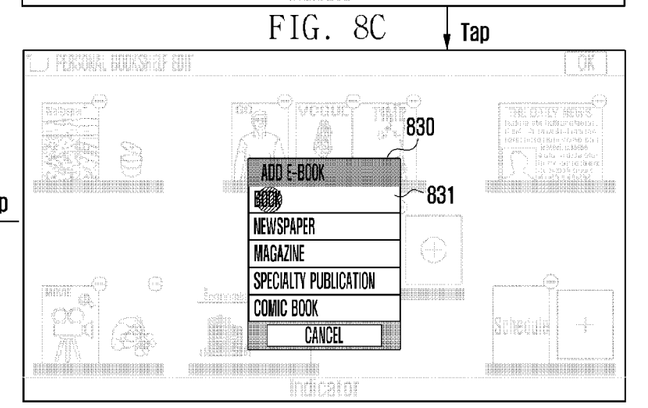
Figure 8D:
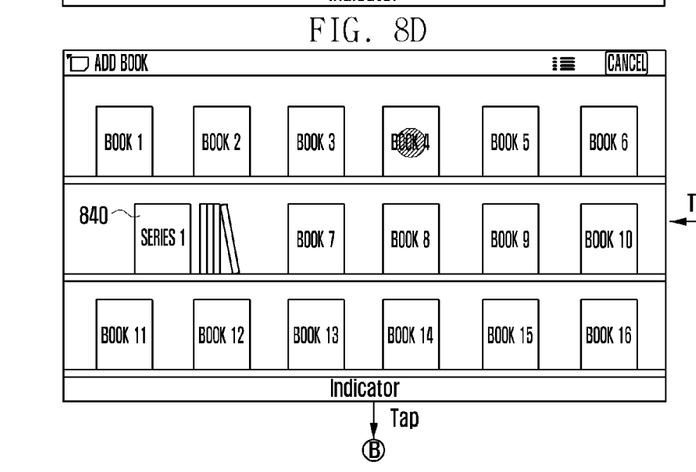
Figure 8E:
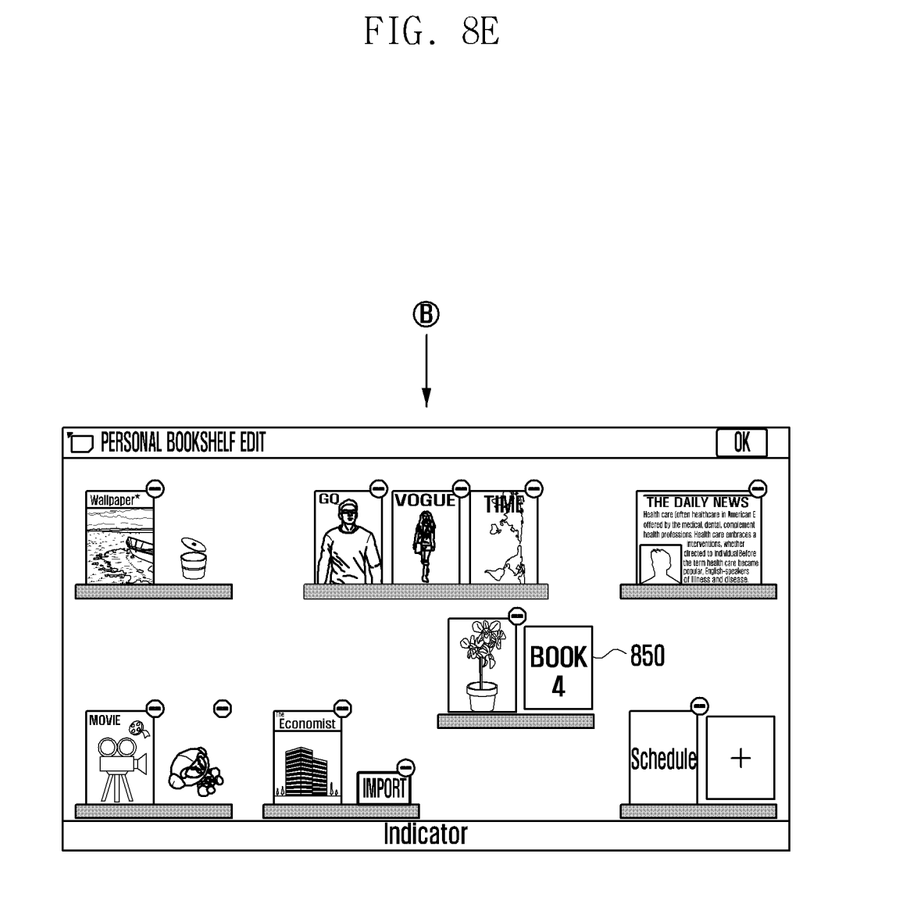

FIGS. 8A and 8E illustrate screens to describe a method for adding an e-book in a personal bookshelf, according to an exemplary embodiment of the invention. As shown in FIG. 8A, the controller 170 controls the display unit 130 to display a bookshelf edit screen 810. If the user taps an addition button 811 on the bookshelf edit screen 810 as shown in FIG. 8A, it controls the display unit 130 to display an item selection screen 820 as shown in FIG. 8B. If the user taps an e-book 821 on the item selection screen 820 as shown in FIG. 8B, it controls the display unit 130 to display a category selection screen 830 as shown in FIG. 8C. The category selection screen 830 may be defined as a screen for selecting a category of an e-book to be added to a personal bookshelf. The category selection screen 830 includes a book selection menu, a newspaper selection menu, a magazine selection menu, a specialty publication selection menu, a comic book selection menu, etc. If the user taps a book selection menu 831 on the category selection screen 830 as shown in FIG. 8C, it controls the display unit 130 to display a list of books as shown in FIG. 8D. A series of books 840 may be displayed as an image of held books or an image of stacked books. If the user taps one of the books, stored in the bookshelves, on the screen as shown in FIG. 8D, the controller 170 controls the display unit 130 to display information regarding a corresponding e-book 850 on the personalized bookshelf as shown in FIG. 8E.

As described in the above non-limiting examples, the book-related item managing system and method according to the present invention can provide bookshelves and allow the users to easily manage e-books, via the bookshelves, according to his/her preference.

The above-described methods according to the present invention can be implemented in hardware, firmware or as software or computer code that is loaded into hardware such as a microprocessor and can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer and loaded into hardware such as a processor or microprocessor, or a special processor or in programmable or dedicated hardware, such as an ASIC or FPGA. As would be understood in the art, the computer, the processor, microprocessor or controller are hardware elements and the claims are to be interpreted with such elements comprising hardware, and not to be interpreted as pure software that is outside the scope of a statutory invention. The programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

As described above, the book-related item managing method according to the invention can be implemented with program commands that manipulate hardware, and the broadest reasonable interpretation of the claims are a statutory one that is no way pure software or mental tasks. The presently claimed invention can be embodied in various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art. The computer-readable recoding media includes hardware systems for storing and conducting program commands. Examples of the hardware systems are magnetic media such as a hard disk, floppy disk, a magnetic tape, optical media such as CD-ROM and DVD, Magneto-Optical Media, such as floptical disk, ROM, RAM, flash memory, etc. The program commands include assembly language or machine code complied by a complier and a higher level language interpreted by an interpreter. The hardware systems may be implemented with at least one software module to comply with the invention.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A method for managing book-related items in a mobile device comprising:
    displaying a plurality of bookshelves having book-related items displayed on the plurality of bookshelves;
    in response to detecting a first touch input while maintaining display of the plurality of bookshelves, displaying a first button on a first bookshelf and a second button on a second bookshelf, the first bookshelf and second bookshelf each having an empty area without one of the book-related items, each particular button selectable to edit a particular bookshelf on which the particular button is displayed; and
    in response to detecting a second touch input to the first button, editing the first bookshelf on which the first button is displayed according to a type of a book-related item of the particular bookshelf, and
    displaying the edited first bookshelf including at least one additional book-related item on a display screen,
    wherein deletion buttons are displayed on all book-related items disposed on the plurality of bookshelves in response to detecting the first touch input, each deletion button selectable to remove display of a respective book-related item from a respective bookshelf.

2. The method of claim 1, further comprising:
    displaying the plurality of bookshelves in a default bookshelf screen wherein the book-related items are arranged on the plurality of bookshelves according to preset categories, each bookshelf corresponding to one of the preset categories; and
    in response to detecting a swipe input, removing the default bookshelf screen and displaying a personal bookshelf screen wherein the book-related items are arranged on the plurality of bookshelves irrespective of the preset categories,
    wherein the book-related items comprises an e-book.

3. The method of claim 1, wherein the book-related items comprises at least one of the following:
    a folder for holding a plurality of e-books, a schedule for reading e-books, and an accessory for decorating the particular bookshelf.

4. The method of claim 2, wherein the editing of the particular bookshelf comprises:
    detecting selection of the book-related item to be added to the particular bookshelf; and adding information related to the selected book-related item to the particular bookshelf and displaying the particular bookshelf.

5. The method of claim 4, wherein the selection of the book-related item comprises:
displaying a list including types of the book-related item addable to the particular bookshelf and detecting selection of a type from the list;
displaying categories book-related items corresponding to the type in response to the detected selection of the type and detecting a selection of one of the displayed categories;
displaying a list of e-books related to the selected one of the displayed categories; and
detecting selection of one or more e-books from the list.

6. The method of claim 4, wherein the displaying the edited first bookshelf comprises:
displaying on the display screen a folder and information regarding one of a plurality of e-books in the folder.

7. The method of claim 6, wherein the folder is displayed as an image including a number of e-books.

8. The method of claim 1, wherein the display screen comprises a personalized bookshelf screen, and
wherein displaying the edited first bookshelf comprises:
when an event related to a bookshelf edit occurs during the display of the personalized bookshelf screen, displaying the bookshelf edit screen to edit the personalized bookshelf screen,
wherein a default bookshelf screen comprises default bookshelves classified according to predetermined categories, and the personalized bookshelf screen comprises at least one personalized bookshelf screen in which bookshelves can be edited irrespective of the predetermined categories.

9. The method of claim 8, wherein information displayed on the display screen regarding e-books in the personalized bookshelf comprises:
a shortcut icon corresponding to an e-book in one of the default bookshelves.

10. The method of claim 9, further comprising:
deleting the shortcut icon without removing the corresponding e-book from the default bookshelves.

11. A system for managing book-related items in a mobile device comprising:
a display unit that displays a plurality of bookshelves;
a storage unit that stores book-related items that can be added to each of the plurality of bookshelves; and
a controller configured to:
display the plurality of bookshelves having the book-related items disposed on the plurality of bookshelves,
in response to detecting a first touch input while maintaining display of the plurality of bookshelves, display a first button on a first bookshelf and a second button on a second bookshelf, the first bookshelf and second bookshelf each having an empty area without one of the book-related items, each particular button selectable to edit a particular bookshelf on which the particular button is displayed,
in response to detecting a second touch input to the first button, edit the first bookshelf on which the first button is displayed according to a type of a book-related item of the first bookshelf, and
display the edited first bookshelf including at least one additional book-related item on the display unit,
wherein deletion buttons are displayed on all book-related items disposed on the plurality of bookshelves in response to detecting the first touch input, each deletion button selectable to remove display of a respective book-related item from a respective bookshelf.

12. The system of claim 11, the controller further configured to:
display the plurality of bookshelves in a default bookshelf screen wherein the book-related items are arranged on the plurality of bookshelves according to preset categories, each bookshelf corresponding to one of the preset categories; and
in response to detecting a swipe input, remove the default bookshelf screen and displaying a personal bookshelf screen wherein the book-related items are arranged on the plurality of bookshelves irrespective of the preset categories,
wherein the book-related items comprise at least one of an e-book, a folder for holding a number of e-books, a schedule for reading e-books, and an accessory for decorating the particular bookshelf.

13. The system of claim 11, wherein the controller is further configured to:
display a list including types of the book-related items addable to the particular bookshelf, and detect selection of a type from the list;
display categories of e-books corresponding to the type in response to the detected selection of the type;
when one of the displayed categories is selected, display a list of e-books related to the selected one of the displayed categories; and,
when one or more e-books is selected in the list, adding the selected one or more e-books to the particular bookshelf including information regarding the selected one or more e-books.

14. The system of claim 12, wherein the display unit displays the folder and information regarding one of the e-books in the folder.

15. The system of claim 12, wherein the display unit displays the folder shaped as an image including a number of e-books.

16. The system of claim 11, wherein the controller is further configured to:
display the plurality of bookshelves in a default bookshelf screen, a personalized bookshelf screen, and a bookshelf edit screen for editing the personalized bookshelf screen.

17. The system of claim 16, wherein:
the default bookshelf screen comprises default bookshelves classified according to categories; and
the personalized bookshelf screen comprises at least one personal bookshelf where bookshelves can be edited irrespective of categories.

18. The system of claim 17, wherein information regarding e-books in the personalized bookshelf comprises:
a shortcut icon corresponding to an e-book in a default bookshelf.

19. The system of claim 18, wherein the controller is further configured to delete the shortcut icon without removing the e-book from the default bookshelf.

20. The method of claim 1, wherein the button is displayed in the empty area designating that a bookshelf in which the button is displayed has sufficient space to support at least one addition book-related item.

* * * * *